Patented Jan. 12, 1932

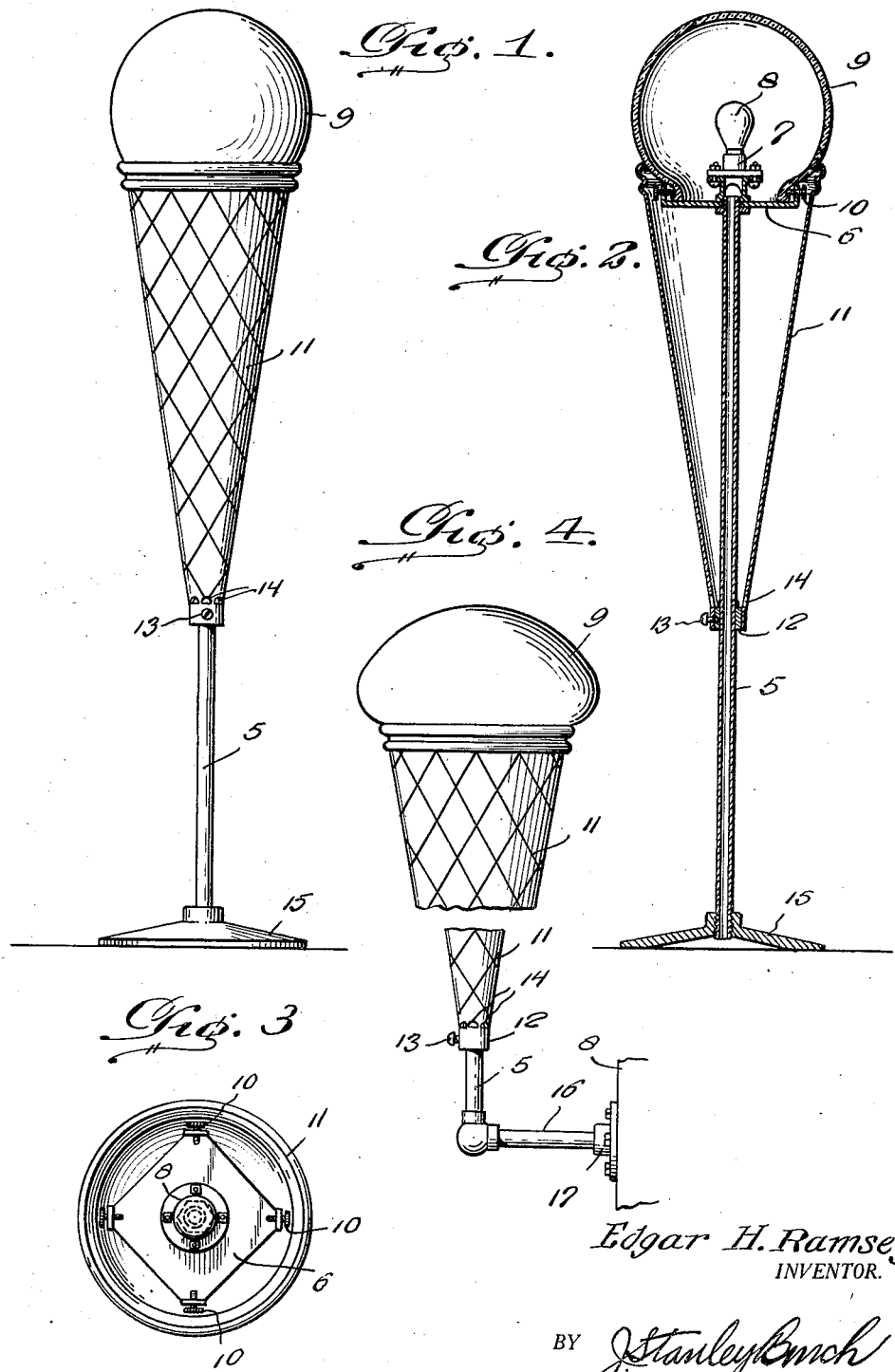

1,840,740

UNITED STATES PATENT OFFICE

EDGAR HOMER RAMSEY, OF JACKSONVILLE, FLORIDA

ILLUMINATED SIGN

Application filed April 14, 1931. Serial No. 530,058.

This invention relates to illuminated signs, and has more particular reference to a novel form of advertising lighting fixture depicting an edible ice cream cone containing ice cream, whereby the fixture may be advantageously employed outside of candy kitchens, ice cream parlors and like places of business to stimulate trade, particularly the sale of ice cream cones.

The primary object of the present invention is to provide an illuminated sign or lighting fixture of the above character which is extremely realistic in appearance and simple and durable in construction.

A more specific object of the invention is to provide a lighting fixture of the above kind including a conical body depicting an edible ice cream cone, and illuminating means including a light transmitting globe located partly within the upper end of the conical body to depict ice cream packed within the edible cone depicted by the conical body.

A still further object is to provide a lighting fixture of the character specified above including a supporting standard having lamp and globe supporting means at its upper end, and a conical body normally encasing the globe supporting means and slidably mounted on the supporting standard so that said body may be lowered to uncover the globe supporting means and permit ready access to or removal of the globe and lamp forming part of the illuminating means.

Other objects will appear as the nature of the invention is better understood, and the same consists in the novel form, combination and arrangement of parts hereinafter more fully described, shown in the accompanying drawings and claimed.

In the drawings:

Figure 1 is an elevational view of an illuminated sign or lighting fixture embodying the present invention.

Figure 2 is a central vertical section thereof.

Figure 3 is a top plan view of the same with the globe removed; and

Figure 4 is a view somewhat similar to Figure 1, partly broken away, of a modified form of the invention.

Referring in detail to the drawings, the present illuminated sign or lighting fixture is shown as embodying a tubular upright or supporting standard 5 having a globe-supporting device 6 and a lamp socket 7 secured on the upper end thereof. A suitable incandescent electric lamp 8 is adapted to be engaged in the socket 7, and suitable conductor wires may be threaded through the standard 5 and connected with the socket 7 for supplying the necessary current to the lamp 8 for lighting purposes. A frosted or milk colored globe 9 is carried by the globe support 6 so as to encase the socket 7 and lamp 8, said globe being fastened in place by screws 10 carried by the globe support 6.

Mounted upon and surrounding the upper portion of the standard 5 is a hollow conical sheet metal body 11 of a shape and external finish to effectively depict an edible ice cream cone. The upper end of this body 11 normally encases the globe support 6 and the the lower portion of the globe 9, but the smaller lower end of said body 11 is slidably mounted on the standard 5 as indicated at 12, being secured by a set screw 13 in its normal upward position with its upper edge in contact with the lower portion of the globe 9 as shown clearly in Figure 2. By loosening the set screw 13, the body 11 may be lowered so as to uncover the globe support 6 and its fastening screws 10, whereby the globe 9 and lamp 8 may be readily removed for renewal or cleaning. Due to the color and shape of the globe 9, it effectively depicts a body of ice cream packed within the upper end of the edible cone depicted by the body 11. The globe 9 may be of substantially spherical form as shown in Figures 1 and 2, or of a more flattened oval form as shown in Figure 4. Further, while the normal contact of the upper edge of the body 11 with the globe 9 below the major horizontal axis of said globe will prevent much water from finding its way into the body 11 during inclement weather when the sign is used outside a store, the lower smaller end portion of the body 11 may be provided with numerous small drain openings as at 14 to more effectively guard against rusting by reason of dampness within the body 11.

As shown in Figures 1 and 2, the sign or lighting fixture may be in the nature of a stand having a relatively large weighted circular base 15 in which the lower end of the standard 5 is centrally secured or threaded. On the other hand, the invention may be readily adapted as a wall fixture by providing the lower end of the standard 5 with a lateral arm 16 in lieu of the base 15, the free end of the arm 16 having suitable means as at 17 for facilitating its attachment to a wall indicated at 18. Other than as noted above, the constructions of Figures 1 to 3 inclusive and Figure 4 are alike, and similar parts are indicated by like reference characters throughout the several views.

From the foregoing description, it will be seen that I have provided a very simple and durable illuminating sign or advertising lighting fixture of the character described, and one in which ready access to the globe and lamp may be had when necessary. It will be further seen that the device is well adapted for use exteriorly of stores as an effective aid in stimulating trade. Minor changes are contemplated within the spirit and scope of the invention as claimed.

What I claim as new is:

1. An illuminated sign comprising a tubular supporting standard having a globe support and a lamp socket secured on the upper end thereof, said supporting standard being adapted to have conductor wires threaded therethrough for connection with said lamp socket, a globe carried by the globe support and encasing said lamp socket, and a conical body mounted on and encasing the upper portion of said supporting standard, the larger upper end of said conical body encasing the globe support and the lower portion of the globe.

2. An illuminated sign comprising a supporting standard, a conical body mounted upon the upper portion of the supporting standard and depicting an edible ice cream cone, a globe support having globe fastening means and mounted upon the upper end of said supporting standard, a lamp socket mounted upon the upper end of said supporting standard, a globe carried by the globe support and depicting ice cream packed within the larger upper end of the cone depicted by said body, the upper end of said body encasing the globe support and the lower portion of the globe.

3. An illuminated sign comprising a supporting standard, a conical body mounted upon the upper portion of the supporting standard and depicting an edible ice cream cone, a globe support having globe fastening means and mounted upon the upper end of said supporting standard, a lamp socket mounted upon the upper end of said supporting standard, a globe carried by the globe support and depicting ice cream packed within the larger upper end of the cone depicted by said body, the upper end of said body encasing the globe support and the lower portion of the globe, said body being vertically adjustable on the standard whereby the same may be lowered to uncover the globe support and the globe fastening means.

4. An illuminated sign of the character described comprising a supporting standard having a lamp socket and a globe support mounted upon the upper end thereof, a conical body mounted upon the upper portion of the standard and having its upper edge normally contacting the globe and encircling the lower portion of the latter and the globe support, said body being vertically adjustable on the standard whereby the same may be lowered for uncovering the globe support and globe fastening means.

In testimony whereof I affix my signature.

EDGAR HOMER RAMSEY.